US011184440B2

(12) United States Patent
Fallon et al.

(10) Patent No.: US 11,184,440 B2
(45) Date of Patent: Nov. 23, 2021

(54) AUTONOMOUS SCALABLE AGENT THAT IMPROVES PERFORMANCE OF NETWORK DEVICE SYSTEMS

(71) Applicant: SCHNEIDER ELECTRIC IT CORPORATION, West Kingston, RI (US)

(72) Inventors: Raymond M. Fallon, Galway (IE); Daniel C. Cohen, Newtonville, MA (US); Maarten Janson, Galway (IE); Colm McCauley, Galway (IE); Nicholas S. Zakas, Andover, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 32 days.

(21) Appl. No.: 15/622,478

(22) Filed: Jun. 14, 2017

(65) Prior Publication Data

US 2018/0367612 A1    Dec. 20, 2018

(51) Int. Cl.
*H04L 29/08*       (2006.01)
*G06F 16/23*       (2019.01)
(Continued)

(52) U.S. Cl.
CPC .............. *H04L 67/12* (2013.01); *G06F 16/23* (2019.01); *G06F 21/81* (2013.01); *G06N 3/006* (2013.01);
(Continued)

(58) Field of Classification Search
CPC . H04L 67/12; H02J 7/00712; H02J 7/007184; G01R 31/371; H04W 72/042
See application file for complete search history.

(56) References Cited

U.S. PATENT DOCUMENTS 6,031,354 A     2/2000  Wiley et al.
2005/0071093 A1*  3/2005  Stefan ................ G01R 19/2513
                                                 702/60
(Continued)

FOREIGN PATENT DOCUMENTS

CN      102205800 A     10/2011
CN      104238491 A     12/2014
CN      104635167 A      5/2015

OTHER PUBLICATIONS

Extended European Search Report from corresponding European Application No. 18175527.3 dated Oct. 11, 2018.

*Primary Examiner* — Minh Chau Nguyen
*Assistant Examiner* — Ishrat Rashid
(74) *Attorney, Agent, or Firm* — Lando & Anastasi, LLP (57) ABSTRACT

According to one aspect, embodiments provide a system for optimizing control schemes executed by a plurality of intelligent agents controlling a plurality of client devices, the system comprising an observer configured to communicate with the plurality of intelligent agents, a database configured to store information received from the plurality of intelligent agents, and an external data source, the observer being further configured to poll the plurality of intelligent agents for operational information of at least one power device, collect information from the external data source and from the database, update the database based on the operational information and the information collected from the external data source and the database, and modify a first control scheme executed by a first intelligent agent of the plurality of intelligent agents to control a first client device.

21 Claims, 4 Drawing Sheets

(51) Int. Cl.
*G06F 21/81* (2013.01)
*G06N 3/00* (2006.01)
*H04L 12/24* (2006.01)
*G01R 31/392* (2019.01)
*G01R 19/25* (2006.01)

(52) U.S. Cl.
CPC .......... *H04L 41/046* (2013.01); *H04L 41/082* (2013.01); *H04L 41/0886* (2013.01); *H04L 41/16* (2013.01); *H04L 67/025* (2013.01); *H04L 67/10* (2013.01); *H04L 67/1095* (2013.01); *H04L 67/34* (2013.01); *H04L 67/36* (2013.01); *G01R 19/2513* (2013.01); *G01R 31/392* (2019.01)

(56) References Cited

U.S. PATENT DOCUMENTS

| | | | |
|---|---|---|---|
| 2009/0091193 A1* | 4/2009 | Page | H02J 9/06 307/140 |
| 2011/0162647 A1* | 7/2011 | Huby | A61M 16/16 128/203.14 |
| 2014/0241354 A1* | 8/2014 | Shuman | H04L 12/281 370/390 |

* cited by examiner

AUTONOMOUS SCALABLE AGENT THAT IMPROVES PERFORMANCE OF NETWORK DEVICE SYSTEMS

BACKGROUND OF INVENTION

1. Field of Invention

The present invention relates generally to systems and methods for controlling Internet-of-Things (IoT) devices.

2. Discussion of Related Art

The use of inter-networked physical devices, generally referred to as IoT devices, is known. Furthermore, it is known to implement a network of IoT devices that includes "dumb" devices and "smart" devices. Dumb devices are designed to be as simple and as inexpensive as possible, and the smart devices are designed to be higher-complexity devices that execute tasks on behalf of the dumb devices. There are many known advantages to implementing a network of smart and dumb devices as IoT devices.

SUMMARY OF INVENTION

At least one aspect of the disclosure is directed to a system for optimizing control schemes executed by a plurality of intelligent agents controlling a plurality of client devices, the system comprising an observer configured to communicate with the plurality of intelligent agents, a database configured to store information received from the plurality of intelligent agents, and an external data source, the observer being further configured to poll the plurality of intelligent agents for operational information of at least one power device, collect information from the external data source and from the database, update the database based on the operational information and the information collected from the external data source and the database, and modify a first control scheme executed by a first intelligent agent of the plurality of intelligent agents to control a first client device.

In some embodiments, the operational information of the at least one power device includes operational information of at least one of an uninterruptible power supply and a power distribution unit.

In some embodiments, the system further comprises the plurality of intelligent agents, wherein each intelligent agent of the plurality of intelligent agents is configured to execute high-complexity tasks on behalf of a respective client device and is further configured to control the respective client device.

In some embodiments, the observer is configured to poll the plurality of intelligent agents for control information, the control information including user preference information.

In some embodiments, the observer is configured to update the database based on the control information, and the database is configured to store the control information.

In some embodiments, the observer is configured to execute a machine learning algorithm to optimize the first control scheme using information received from the plurality of intelligent agents, the external data source, and the database.

In some embodiments, executing the first control scheme includes generating a battery replacement date prediction for the at least one power device.

In some embodiments, optimizing the first control scheme includes optimizing the battery replacement date prediction.

In some embodiments, the observer, the plurality of intelligent agents, and the database are implemented in a remote computing infrastructure.

According to an embodiment, a method is provided for optimizing control schemes executed by a plurality of intelligent agents, the method comprising polling the plurality of intelligent agents for operational information of at least one power device, collecting external information from an external data source, collecting previously-stored operational information of the at least one power device from a database, updating the database based on the operational information of the at least one power device and based on the external information, and modifying a first control scheme executed by a first intelligent agent of the plurality of intelligent agents.

In some embodiments, polling the plurality of intelligent agents for operational information of at least one power device includes polling the plurality of intelligent agents for operational information of at least one of a power distribution unit and an uninterruptible power supply.

In some embodiments, the method further includes polling the plurality of intelligent agents for control information, the control information including user preference information.

In some embodiments, updating the database based on the control information.

In some embodiments, the method further includes executing a machine learning algorithm to optimize the act of modifying the first control scheme executed by the first intelligent agent of the plurality of intelligent agents.

In some embodiments, executing the first control scheme includes generating a battery replacement date prediction.

According to one aspect, a non-transitory computer readable medium storing sequences of computer-executable instructions is provided for optimizing control schemes implemented by a plurality of intelligent agents, the sequences of computer-executable instructions including instructions that instruct at least one processor to poll the plurality of intelligent agents for operational information of at least one power device, collect external information from an external data source, collect previously-stored operational information of the at least one power device from a database, update the database based on the operational information of the at least one power device and based on the external information, and modify a first control scheme executed by a first intelligent agent of the plurality of intelligent agents to control a first client device.

In some embodiments, the at least one processor is further configured to poll the plurality of intelligent agents for control information, the control information including user preference information.

In some embodiments, instructing the at least one processor to poll the plurality of intelligent agents for operational information of at least one power device includes instructing the processor to poll the plurality of intelligent agents for operational information of at least one of a power distribution unit and an uninterruptible power supply.

In some embodiments, the at least one processor is further configured to execute a machine learning algorithm to optimize the act of modifying the first control scheme executed by the first intelligent agent of the plurality of intelligent agents.

In some embodiments, instructing the at least one processor to execute the first control scheme includes generating a battery replacement date prediction.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

A device management system and method is provided in which complex computational loads are handled by intelligent agents remote from client devices. The intelligent agents can also control the operation of the client devices. The device management system and method includes an observer configured to oversee the operation of the client devices by collecting and evaluating information relevant to the control of the client devices from the intelligent agents and using the information to optimize the control of the client devices. Examples provided herein offer an enhanced balance between cost and computing infrastructure while reducing the physical footprints of the client-side devices and optimizing the performance of the client-side devices.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in the plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Figure 1:
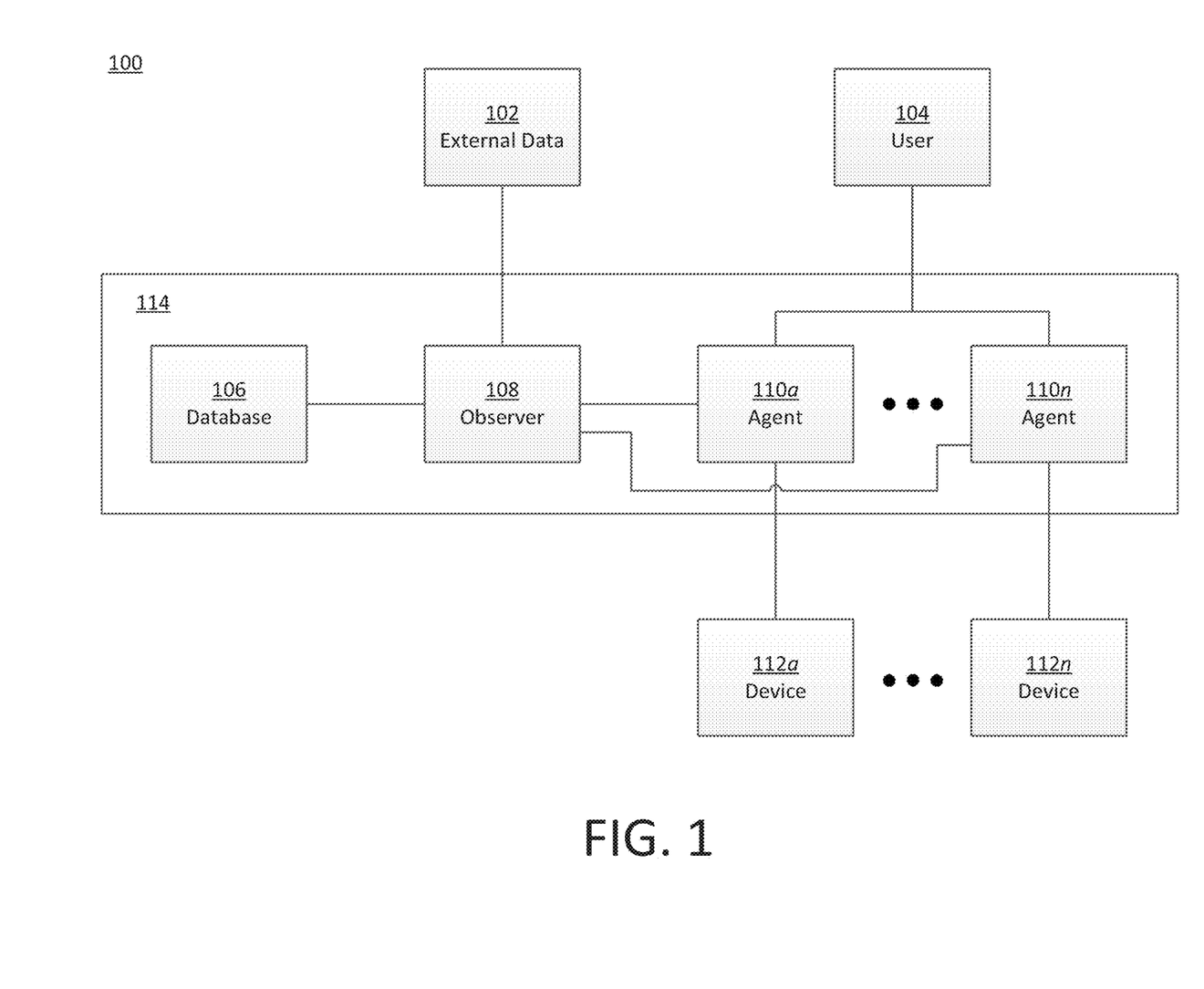
FIG. 1 is a block diagram of a device management system.

FIG. 1 illustrates a device management system 100 according to one embodiment of the present disclosure. The device management system 100 includes an external data source 102, a user 104, a database 106, an observer 108, intelligent agents 110a-110n, and client-side devices 112a-112n. The database 106, the observer 108, and the intelligence agents 110a-110n collectively represent a remote computing infrastructure 114. One of ordinary skill in the art may identify the remote computing infrastructure 114 as, for example, a cloud computing infrastructure.

The client-side devices 112a-112n can be implemented as constrained devices located at a client facility (e.g., a commercial business, a residence, a manufacturing plant, etc.). A constrained device is a simple, low-complexity device connected to a higher-complexity device which silently executes computationally-burdensome tasks on behalf of the constrained device (i.e., without requiring intervention by a user), and which may also monitor the behavior of the constrained device. In the embodiment illustrated by FIG. 1, each of the client-side devices 112a-112n can be remotely connected through a wired or wireless network to one of the intelligent agents 110a-110n, which monitor and control the constrained client-side devices 112a-112n and execute computationally-burdensome tasks on behalf of the constrained client-side devices 112a-112n.

In the following examples, specific reference is made to individual client-side device 112a and individual intelligent agent 110a for purposes of explanation only. The principles discussed herein are applicable to any of the client-side devices 112a-112n and the intelligent agents 110a-110n, and no limitation is meant to be implied by specific reference to the client-side device 112a or to the intelligent agent 110a.

For example, a client-side device 112a can be a power device (e.g., an Uninterruptible Power Supply [UPS], a Power Distribution Unit [PDU], etc.) located at a client facility. The client-side device 112a can be configured to handle low-complexity tasks locally (e.g., measuring and reporting a battery voltage, handling certain low-complexity commands such as shutting down an outlet on the device when instructed to do so by the intelligent agent 110a, etc.) but can also be configured to allow an associated intelligent agent 110a to handle high-complexity tasks (e.g., generating a more accurate battery replacement date prediction where the local algorithm may lack the knowledge of a collective population) remotely. The intelligent agent 110a can also monitor the behavior of the client-side device 112a and correct the operation of the client-side device 112a as the intelligent agent 110a deems appropriate, such as by modifying the frequency at which the client-side device 112a executes a process to optimize the operation of the client-side device 112a. The intelligent agent 110a may also receive input from the user 104, generally referred to as control information, to modify operation of the client-side device 112a or to otherwise customize functions executed by the intelligent agent 110a or the client-side device 112a.

An advantage of the foregoing implementation is that an optimal balance can be struck between cost and computing infrastructure by eliminating the need to perform high-complexity computational tasks in the same location that the client-side devices 112a-112n are implemented. High-performance components can be implemented at any physical location irrespective of the location of the client-side devices 112a-112n, which may be more restricted in their placement. Eliminating this design constraint enables cost reductions in various capacities.

Another advantage provided by at least some systems and methods described herein is that, because of the minimized number of components in the client-side devices 112a-112n, the client-side devices 112a-112n can be more physically compact and less expensive. The client-side devices 112a-112n will therefore have a smaller physical footprint in the client facility where space may be more limited and valuable, while still executing critical functions. For example, where one of the client-side devices 112a-112n is implemented as a UPS, the UPS can still provide back-up power while occupying less space where the systems requiring back-up power are located. In some embodiments, the client-side devices 112a-112n can be configured to locally store information necessary to execute critical functionality without communicating with the intelligent agents 110a-110n. Accordingly, the client-side devices 112a-112n can still execute critical functions even if network connectivity with the client-side devices 112a-112n is compromised.

The observer 108 provides additional advantages by overseeing operation of the intelligent agents 110a-110n. The observer 108 gathers information from each of the intelligent agents 110a-110n, from an external data source 102, and from a database 106, and utilizes a machine learning algorithm to identify relevant information from the gathered information and to update the control scheme implemented by the intelligent agents 110a-110n. The machine learning algorithm executed by the observer 108 is constantly evolving as it receives more information such that the observer 108 can optimize the control schemes implemented by the intelligent agents 110a-110n. In this capacity, each of the intelligent agents 110a-110n has indirect access to a much wider array of information and can execute a more informed, and therefore more effective, control scheme for the client-side devices 112a-112n.

Figure 2:
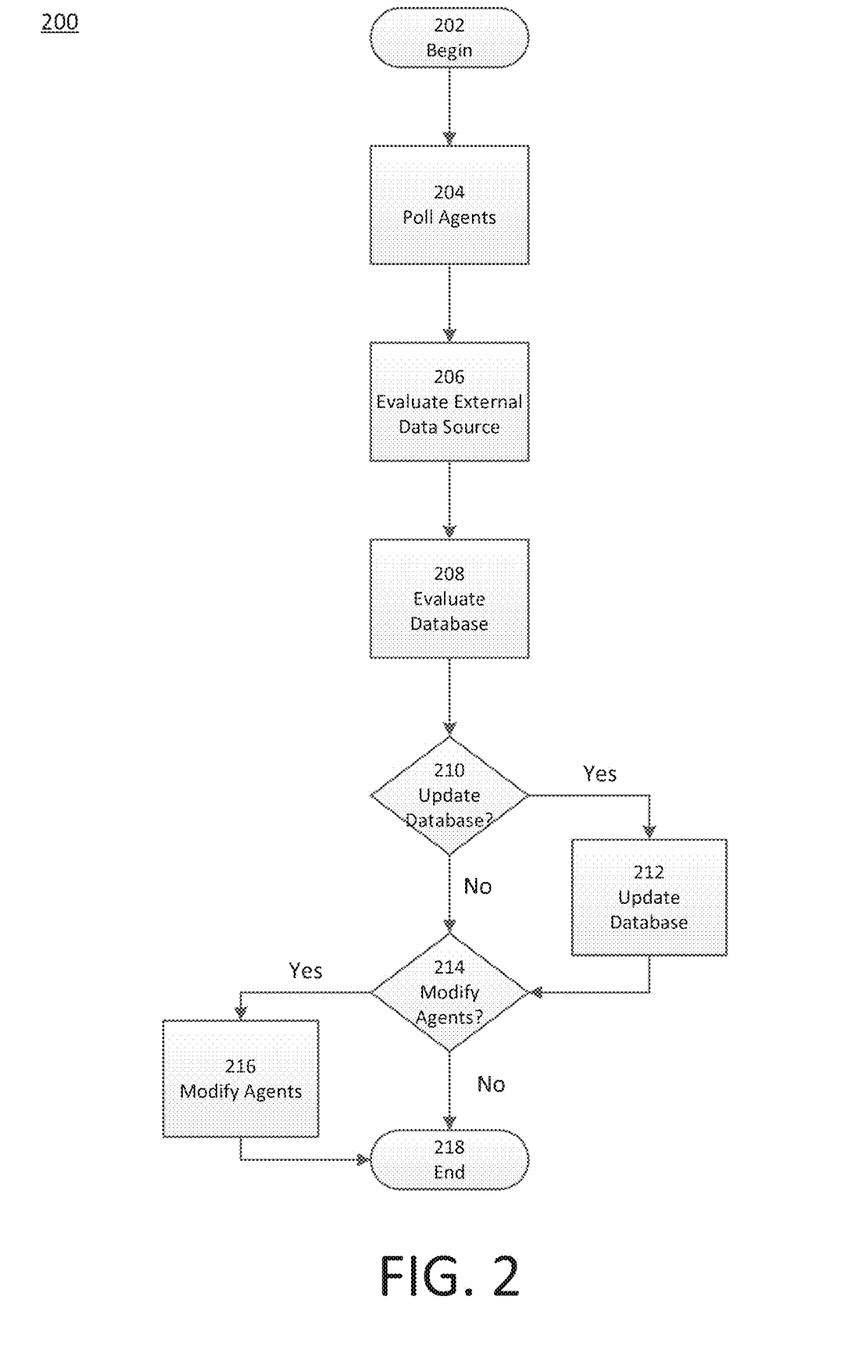
FIG. 2 is a flow chart of a device management process.

FIG. 2 illustrates a process 200 executed by the observer 108 to enhance the operation of the client-side devices 112a-112n. The process 200 includes acts of polling agents at act 204, evaluating an external data source at 206, evaluating a database at act 208, determining whether to update the database at acts 210 and 212, and determining whether to modify the agents at acts 214 and 216.

At act 202, the process 200 begins. At act 204, the observer 108 polls the intelligent agents 110a-110n. The observer 108 can poll the intelligent agents 110a-110n for any operational information including, for example, power quality information, ambient temperature information, memory usage information, device model information, device manufacturer information, and any other information relevant to the operation of the client-side devices 112a-112n that the intelligent agents 110a-110n can access, at a period or aperiodic frequency. The frequency can be selected by a user or automatically determined by the observer 108. At act 206, the observer 108 evaluates an external data source 102 to gather relevant external data, such as weather data. At act 208, the observer 108 evaluates the database 106 for relevant previously-stored data including, for example, trend data for the intelligent agents' 110a-110n operational information discussed above.

At act 210, the observer 108 determines whether or not to update the database 106. For example, the observer 108 may update the database 106 if the operational information acquired at act 204 is anomalous, as discussed in greater detail below. If the observer 108 determines that the database 106 should be updated (210 YES), then the observer 108 updates the database at act 212 and continues to act 214. Otherwise (210 NO), the process 200 continues directly to act 214 from act 210.

At act 214, the observer 108 determines whether or not to modify the intelligent agents 110a-110n. For example, the observer 108 may determine that one or more of the intelligent agents 110a-110n are not controlling respective client-side devices 112a-112n in an optimal fashion, and therefore determine that it would be advantageous to modify the one or more intelligent agents 110a-110n (214 YES). At act 216, the observer 108 modifies the one or more intelligent agents 110a-110n, such as by modifying a configuration setting in the one or more intelligent agents 110a-110n or by modifying a configuration setting in a program executed by the one or more intelligent agents 110a-110n, to optimize the control scheme of the one or more intelligent agents 110a-110n. The process 200 then ends at act 218. Otherwise (214 NO), the process 200 proceeds directly from act 214 and ends at act 218.

To illustrate the foregoing principles, an example is provided in which a client-side device 112a, which is controlled by an intelligent agent 110a, is implemented as a UPS configured to switch from a mains power supply to a back-up battery power supply if the mains power supply quality falls outside of a threshold. For example, if the UPS expects to receive AC mains input power having a voltage of 120 VAC, and has a threshold of 2V, the UPS will switch to back-up power if the mains input power deviates by more than 2V from the expected 120 VAC waveform.

The observer 108 begins the process 200 at act 202 to optimize control of the client-side device 112a implemented as a UPS. At act 204, the observer 108 polls the intelligent agent 110a for local operational data including, for example, UPS model information, UPS power quality data and data indicative of the UPS threshold settings relevant to the client-side device 112a.

At acts 206 and 208, the observer 108 acquires and evaluates global data (i.e., data not directly accessible by the intelligent agent 110a) pertinent to the regional power quality of the location at which the client-side device 112a is implemented (e.g., a long period of irregular voltage that the UPS can handle without switching to battery power, such as a 5-10 VAC irregularity, is determined to be likely based on the regional power quality data) to determine the likelihood that the mains power supply will fail. For example, the observer 108 can execute this evaluation based on an evaluation of data from the external data source 102 (e.g., electrical grid data) at act 206 and/or based on data from the database 106 (e.g., previously- or contemporaneously-acquired data from other intelligent devices 112a-112n) at act 208, which the observer 108 identified as bearing a predictive connection to the mains power supply at the client-side device 112a. Based on the observer's 108 evaluation of the data from the external data source 102 and the data from the database 106, the observer 108 may update the database 106 at act 210.

Based on the observer's 108 determination that the power being provided to the client-side device 112a is of good quality, the observer 108 evaluates whether to modify the intelligent agent 110a, or any of the other intelligent agents 110a-110n, at act 214. For example, the observer 108 may determine that the back-up battery threshold set by the intelligent agent 110a is inappropriate in view of the lower power quality. The observer 108 can update the control scheme of the intelligent device 112a to loosen the threshold outside of which the back-up battery power supply will be activated, and the process 200 ends at act 218. The client-side device 112a is therefore enabled with a dynamic power quality threshold that is more responsive and adaptive to changing power quality conditions affecting the client-side device 112a. Additional benefits conferred as a result of adapting a device to changing conditions in a geographical region are described in U.S. patent application Ser. No. 14/971,244, titled "Systems and Methods for Dynamic UPS Optimization," filed Dec. 16, 2015, which is hereby incorporated by reference in its entirety.

The external data source 102 and the database 106 will now be described in greater detail. The external data source 102 includes any information external to the device management system 100, generally referred to as external information. For example, the external data source 102 can provide weather data (e.g., temperature information, humidity information, inclement weather information, etc.), electrical grid information (e.g., information describing regions affected by black-outs or brown-outs, energy demand information, energy pricing information, power quality information, etc.), location data, manufacturing data, trend data for any of the foregoing, and so forth. The external data source 102 can include multiple entities, each of which includes an Application Programming Interface (API) through which the external data source 102 can communicate with the observer 108.

The database 106 stores any information internal to the device management system 100. For example, the database 106 can store user preference information (e.g., information input by the user 104), data gathered from client-side devices 112a-112n by the intelligent agents 110a-110n (e.g., data grouped by region, time zone, customer type, device type, or any other criteria), and so forth. The user 104 can modify information in the database 106 using a mobile terminal, a local user interface, a web interface, or any other interface. The database 106 can be implemented at any physical location and is not constrained by the physical location of any other device.

In addition to evaluating data stored in the database 106, the observer 108 can also be configured to oversee the addition of new data and information to the database 106. For example, the observer 108 can poll the intelligent agents 110a-110n for data collected from the client-side devices 112a-112n (e.g., energy consumption information, electrical grid uptime, battery charging time, battery storage capacity, battery storage capacity as a function of time and usage, real time calibration results, etc.) and evaluate the gathered data to determine whether the database 106 should be updated. The observer 108 may be configured to update the database 106 if, for example, the gathered data is anomalous compared to the data in the database 106, compared to similar categories of data gathered from other intelligent agents 110a-110n, compared to what the observer 108 itself expects, and so forth. The observer 108 can consider the information collected from the external data source 102 when evaluating whether or not the gathered data is anomalous. In other examples, the observer 108 can be configured to update the database 106 according to an amount of time that has elapsed, according to a command sent by the user 104, or according to any other configurable threshold that the observer 108 can detect.

The data stored by the observer 108 in the database 106 can be grouped and evaluated dynamically by the observer 108, or according to a configuration set by a user (e.g., the user 104) or the entity operating the platform. For example, the observer 108 can be configured to group device relationships by location, time zone, customer type (e.g., residential, commercial, etc.), device type, or any other criteria specified by a user or automatically generated by the observer 108. Each grouping can have variable levels of granularity. For example, grouping devices by location can include various levels including grouping devices by the same data center rack, the same data center row, the same data center room, the same data center facility, the same state, the same country, and so forth. The observer 108 may be configured to store information in the database 106 according to the foregoing relationships, or the observer 108 may be configured to generate the foregoing relationships in real time.

Figure 3:
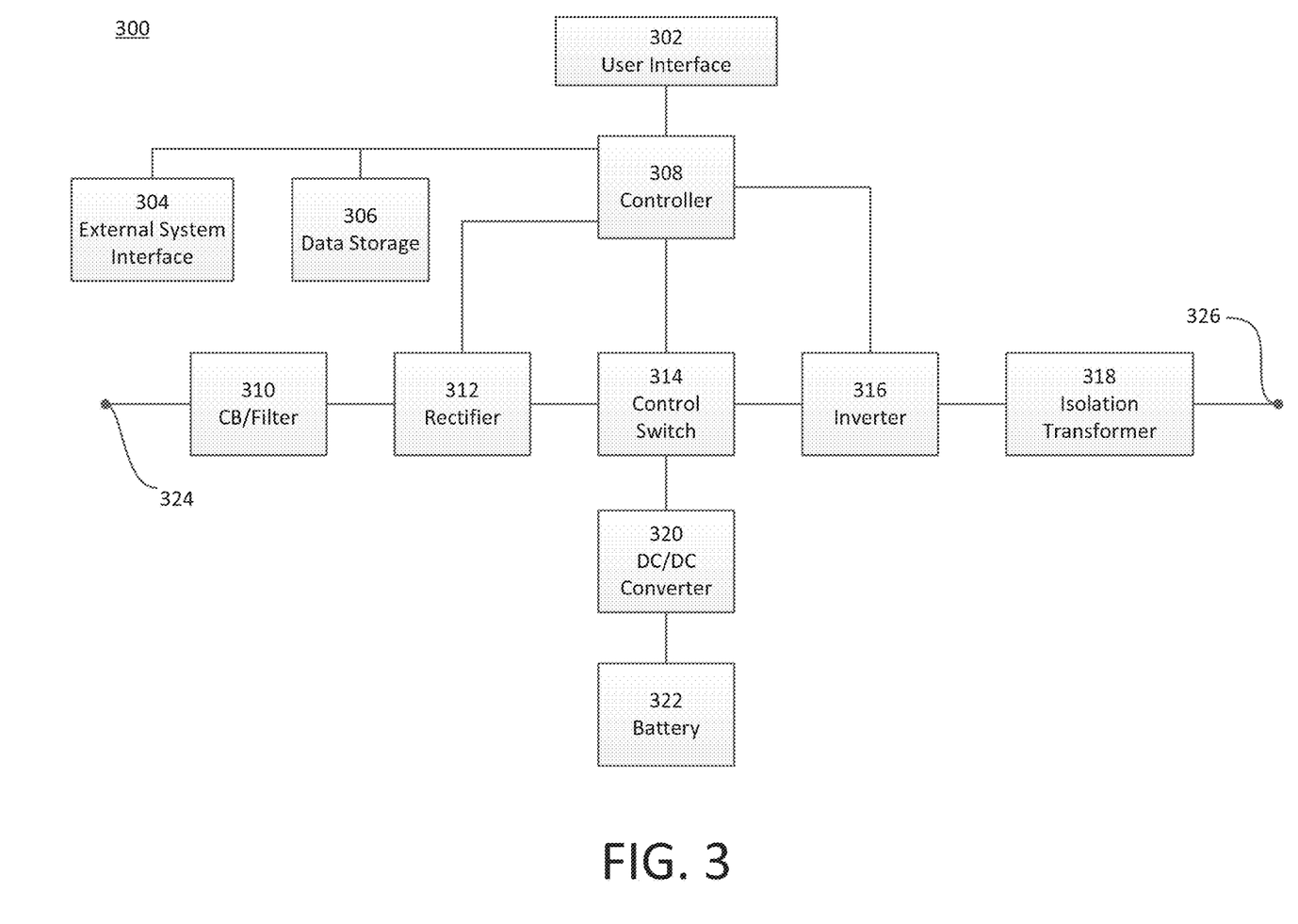
FIG. 3 is a block diagram of an uninterruptible power supply.

As discussed above, one or more of the client-side devices 112a-112n may be implemented as power devices, such as UPSs, PDUs, or any other power device. FIG. 3 shows an online UPS 300 used to provide regulated, uninterrupted power in accordance with one example in accordance with the present invention. The UPS 300 includes an input Circuit Breaker (CB)/filter 310, a rectifier 312, a control switch 314, a controller 308, a battery 322, an inverter 316, an isolation transformer 318, a DC/DC converter 320, a user interface 302, data storage 306 and external system interface 304. The UPS also includes an input 324 for coupling to an AC power source, such as an AC mains, and an outlet 326 for coupling to a load.

The UPS 300 operates as follows. The CB/filter 310 receives input AC power from the AC power source through the input 324, filters the input AC power and provides filtered AC power to the rectifier 312. The rectifier 312 rectifies the input voltage. The DC/DC converter 320 regulates DC power from the battery 322. The control switch 314 receives the rectified power and also receives the DC power from the DC/DC converter 320.

The controller 308 determines whether the power available from the rectifier 312 is within predetermined tolerances (e.g., the voltage threshold discussed above), and if so, controls the control switch 314 to provide the power from the rectifier 312 to the inverter 316. If the power from the rectifier 312 is not within the predetermined tolerances, which may occur because of "brown out" or "black out" conditions, or due to power surges, then the controller 308 controls the control switch 314 to provide the DC power from the DC/DC converter 320 to the inverter 316. The controller 308 may be in communication with an associated intelligent agent 110a. For example, the intelligent agent 110a may oversee operation of the controller 308, or may substantially control the operation of the controller 308. In alternate examples, the controller 308 may be omitted completely and the intelligent agent 110a may directly control operation of the UPS 300, performing the function of the controller 308 remotely.

The inverter 316 of the UPS 300 receives DC power and converts the DC power to AC power and regulates the AC power to predetermined specifications. The inverter 316 provides the regulated AC power to the isolation transformer 318. The isolation transformer 318 is used to increase or decrease the voltage of the AC power from the inverter 316 and to provide isolation between a load and the UPS 300. The isolation transformer 318 is an optional device, the use of which is dependent on UPS output power specifications. Depending on the capacity of the battery 322 and the power requirements of the load, the UPS 300 can provide power to the load during brief power source dropouts or for extended power outages.

Specific examples in accordance with the present invention include several variations of the UPS 300. For instance, in one example, the UPS 300 is configured to accept and distribute polyphase power, such as three-phase power. In some examples, the outlet 326 includes a plurality of physical outlet groups, each of which includes a plurality of physical outlets. In other examples, the UPS 300 is configured to monitor and record, in data storage 306, the amount of power supplied via these outlet groups and outlets. This information can be collected by a respective intelligent agent 110a, as discussed herein. In other examples, the UPS 300 is a standby or offline UPS. In other examples, the UPS 300 is a line-interactive UPS.

Returning to the example of FIG. 3, the controller 308 monitors and controls operation of the UPS 300. Using data stored in associated memory, the controller 308 also executes one or more instructions that may result in manipulated data. In some examples, the controller 308 may include one or more processors or other types of controllers. In another example, the controller 308 executes a portion of the functions disclosed herein using an application-specific integrated circuit (ASIC) tailored to perform particular operations. As illustrated by these examples, examples in accordance with the present invention may perform the operations described herein using many specific combinations of hardware and software and the invention is not limited to any particular combination of hardware and software components. As discussed above, in some examples, an intelligent agent 110*a* may control, or completely replace, the controller 308.

The data storage 306 stores computer-readable information required for the operation of the UPS 300. This information may include, among other information, data subject to manipulation by the controller 308 and instructions that are executable by the controller 308 to manipulate data. Thus, in some embodiments, the data storage 306 can receive and store or retrieve and provide this computer-readable information. The data storage 306 may include relatively high-performance, volatile, random access memory such as a dynamic random access memory (DRAM) or static memory (SRAM) or may include a nonvolatile storage medium such as read-only memory (ROM), magnetic disk, flash memory, CD, DVD or one or more electrical switches, such as a dip switch. In one example, the data storage 306 includes both volatile and non-volatile storage. Various examples in accordance with the present invention can organize the data storage 306 into particularized and, in some cases, unique structures to perform the aspects and functions disclosed herein. In addition, these data structures may be specifically configured to conserve storage space or increase data exchange performance.

In one example, the data storage 306 includes data structures that house system information regarding the UPS 300 and devices coupled to it. Examples of system information are discussed below and include, among other information, configuration management information and performance information. The devices that may be coupled to the UPS 300 include any electronic device that requires power to function, such as, among others, computers, printers, routers, switches, automatic transfer switches and air conditioning units. Some devices may also include communication components, such as Ethernet or USB interfaces, that can be coupled to the UPS 300 via external system interface 304 to allow for enhanced communication between the device and the UPS 300.

Configuration management information may be any information that can be used to identify attributes of the UPS 300 or other devices. Examples of configuration management information specific to a device include, among other information, manufacturer, model, serial number and version. In addition, configuration management information may also include manufacturer, model, serial number and version information for components included in the device, such as software installed on the device or identifiable hardware elements within the device.

Performance information may be any information that characterizes the operation of the UPS 300 or other devices. Examples of performance information include, among other information, device uptime information, operational logs and power consumption information, battery capacity degradation, battery charging speed degradation, UPS runtime predictions, etc. Power consumption information may include listed, i.e. nameplate, values and actual measured values for power consumption of the device. A respective intelligent agent 110*a* connected to the UPS 300 can be configured to poll the UPS 300 for some or all of the configuration management information and the performance information discussed above. In some examples, the operational information collected by the intelligent agents 110*a*-110*n* includes one or both of the configuration management information and the performance information.

The external system interface 304 exchanges data with one or more external devices. These external devices may include any device configured to communicate using standards and protocols supported by the UPS 300, such as the intelligent agents 110*a*-110*n*. Examples of specific standards and protocols that the external system interface 304 may support include parallel, serial, and USB interfaces. Other examples of these supported protocols and standards include networking technologies such as UDP, TCP/IP, Modbus and Ethernet technologies. In at least some examples, the external system interface 304 includes a network interface which makes the UPS accessible on an Ethernet based network and a USB interface. In these examples, the external system interface 304 can receive or transmit data using either or both of these conduits.

In some examples, the user interface 302 includes a display screen and a set of keys through which a user of the UPS 300 can monitor, control and configure operation of the UPS 300. In some embodiments, the user interface 302 includes a power button, a replace battery indicator, a warning indicator, an on-battery power indicator, an online power indicator, an interface display, a scroll up button, a scroll down button, an enter button, and an escape button. However, as discussed above, the UPS 300 may be a low-complexity device and in some examples may not include a user interface 302 capable of monitoring, controlling or configuring the UPS 300 at all, as these functions may be overseen by the intelligent agent 110*a* associated with the UPS 300. In some examples, the user interface 302 may be capable of extremely limited functionality, or may be removed altogether.

Implementing the device management system 100 with a UPS, such as the online UPS 300, allows the UPS 300 to behave more intelligently. In a first example, the back-up power threshold can be dynamically adjusted, as discussed above, to provide a more adaptive response to changing power conditions. In another example, predicting a replacement date for a UPS battery, such as the battery 322, can be achieved with increased accuracy by implementing the principles discussed herein.

Estimating a remaining UPS battery lifetime is difficult to achieve accurately. Battery lifetime, defined as the predicted time after which the battery must be replaced, is affected by a wide variety of variables including average temperatures, maximum temperatures, minimum temperatures, ambient humidity, the specific load characteristics of the load to which the UPS is connected, the frequency and duration of battery uptime, the quality of the power received by the battery to charge the battery, and many other factors which cannot be known at the time of manufacture before the battery is actually implemented. For example, some UPSs use lead-acid batteries where the battery capacity can be difficult to predict and where external factors, including those discussed herein, impact the battery capacity.

Accordingly, it would be advantageous to be able to continuously and dynamically adapt a UPS battery lifetime prediction to a specific UPS battery implementation and to the variables associated with the specific UPS battery implementation. Furthermore, it would be advantageous to collect information from other UPSs to provide a more accurate prediction of a UPS battery lifetime.

The device management system 100 provides this functionality where one or more of the client-side devices 112a-112n are implemented as UPSs. The intelligent agents 110a-110n associated with the client-side devices 112a-112n can collect information that affects the lifetime of the UPS battery, and provide the information to the observer 108. The observer 108, which receives such information from each of the intelligent agents 110a-110n that is connected to a UPS, can use a machine learning algorithm to generate an evolving, adaptive prediction of each individual UPS battery lifetime based on the relevant factors discussed above.

The observer 108 can generate a UPS battery lifetime prediction based on any one or more of a variety of factors. For example, the observer 108 may observe that a particular UPS battery experiences an abnormally high number of local temperature maxima, or that the UPS battery experiences abnormally high or low average temperatures, or that the UPS battery is activated with an abnormally high frequency because it is implemented in a region with frequent electrical grid failures. The observer 108 may predict that the battery lifetime is lower than average because the observer 108 has observed lower average battery lifetimes in UPS batteries exhibiting one or more of the foregoing factors.

The observer 108 can dynamically determine a weight to assign to collected information when generating a predicted UPS battery lifetime. For example, the observer 108 can determine that a first UPS battery and a second UPS battery are each the same model, were manufactured at roughly the same time, and are implemented in similar settings. The observer 108 can also interface with the external data source 102, for example, to receive data provided by the manufacturer of the batteries that contains lot numbers to further enhance the quality of the prediction. For example, some batches may exhibit similar behavior that varies as compared to other batches. The observer 108 can therefore determine that the behavior of the first UPS battery is highly predictive of the behavior of the second UPS battery, and vice-versa. Accordingly, the observer 108 can assign a greater weight to operational data of a first UPS battery when predicting the behavior of the second UPS battery.

Furthermore, the observer 108 can provide region-specific control schemes. For example, where an exemplary client-side device 112a is located in Ireland, the observer 108 may only evaluate data from other client-side devices 112a-112n located in Ireland to optimize the client-side devices 112a-112n. The observer's 108 decision may be based, for example, on a determination by the observer 108 that specific electrical device regulations in Ireland necessitate the omission of other countries' client-side devices 112a-112n from affecting the control of the Irish client-side device 112a because of the unique conditions inherent to the Irish client-side device 112a. In alternate embodiments, the observer 108 can regard a specific country's unique conditions as simply being another factor to consider when evaluating a specific client-side device 112a.

The observer's 108 ability to dynamically adapt the intelligent agents' 110a-110n behavior also provides a more convenient user experience by obviating the need for the user to perform firmware updates. In conventional UPSs, for example, a user must update the UPS firmware to fix bugs or other problems, which is problematic for at least two reasons. A first problem is that a user must manually perform or enable the update, which can be very burdensome depending on the frequency of the firmware updates and the number of UPSs that the user is updating. A second problem is that the UPS is non-operational while it is undergoing a firmware update. Critical systems connected to the UPS will not have access to back-up power while the UPS is undergoing the firmware update, rendering the critical systems vulnerable to any loss of power.

The intelligent agents 110a-110n address this issue by dynamically adapting their behavior in real time without requiring firmware updates, because the intelligent agents 110a-110n are effectively an extension to the firmware. If an intelligent agent 110a identifies a problem or bug in the firmware employed by the intelligent agent 110a, the intelligent agent 110a can simply adapt the behavior of the intelligent agent 110a to correct for the errors introduced by the problem or bug until the user 104 decides to update the firmware of the intelligent agent 110a to permanently remove the bug or problem.

The observer 108 provides additional advantages by enabling internal clock synchronization across the intelligent agents 110a-110n and the client-side devices 112a-112n. The intelligent agents 110a-110n and the client-side devices 112a-112n can all include internal clocks, but without any communication between the devices to ensure synchronization, there are inevitable inconsistencies with the time kept by each of the clocks. The observer 108 addresses these inconsistencies by providing a single centralized clock that all of the intelligent agents 110a-110n and client-side devices 112a-112n adhere to. The observer 108 can automatically re-synchronize the internal clocks if a threshold deviation between the clock of the observer 108 and the clock of a device is exceeded, which allows the device management system 100 to provide a more consistent unified time-keeping scheme.

Various aspects and functions described herein may be included as specialized hardware or software components executing in one or more computer systems. One or more acts of the method described above may be performed with a computer, where at least one act is performed in a software program housed in a computer. Non-limiting examples of computer systems include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 4:
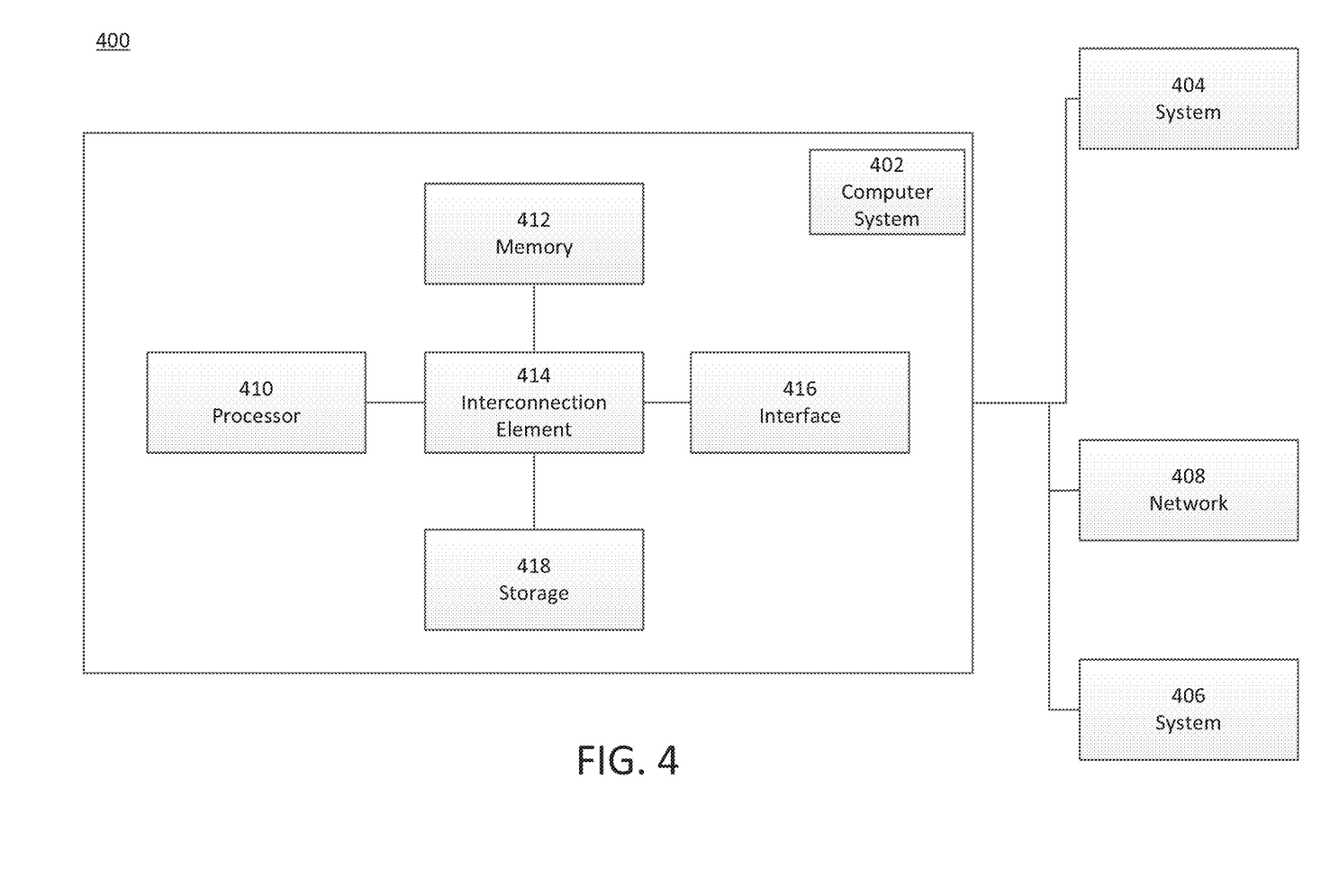
FIG. 4 is a block diagram of a distributed computer system.

Referring to FIG. 4, there is illustrated a block diagram of a distributed computer system 400, in which various aspects and functions are practiced. As shown, the distributed computer system 400 includes one or more computer systems that exchange information. More specifically, the distributed computer system 400 includes computer systems/devices 402, 404 and 406. As shown, the computer systems/devices 402, 404 and 406 are interconnected by, and may exchange data through, a communication network 408. The network 408 may include any communication network through which computer systems may exchange data. To exchange data using the network 408, the computer systems/devices 402, 404 and 406 and the network 408 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 402, 404 and 406 may transmit data via the network 408 using a variety of security measures including, for example, TLS, SSL or VPN. While the distributed computer system 400 illustrates three networked computer systems, the distributed computer system 400 is not so limited and may include any number of computer systems and computing devices, networked using any medium and communication protocol.

As illustrated in FIG. 4, the computer system 402 includes a processor 410, a memory 412, an interconnection element 414, an interface 416 and data storage element 418. To implement at least some of the aspects, functions and processes disclosed herein, the processor 410 performs a series of instructions that result in manipulated data. The processor 410 may be any type of processor, multiprocessor or controller. Some example processors include commercially available processors such as an Intel Atom, Itanium, Core, Celeron, or Pentium processor, Core i3, i5 or i7, an AMD Opteron processor, a Sun UltraSPARC or IBM Power5+ processor and an IBM mainframe chip. The processor 410 is connected to other system components, including one or more memory devices 412, by the interconnection element 414.

The memory 412 stores programs and data during operation of the computer system 402. Thus, the memory 412 may be a relatively high performance, volatile, random access memory such as a dynamic random access memory ("DRAM") or static memory ("SRAM"). However, the memory 412 may include any device for storing data, such as a disk drive or other nonvolatile storage device. Various examples may organize the memory 412 into particularized and, in some cases, unique structures to perform the functions disclosed herein. These data structures may be sized and organized to store values for particular data and types of data.

Components of the computer system 402 are coupled by an interconnection element such as the interconnection element 414. The interconnection element 414 may include one or more physical busses, for example, busses between components that are integrated within a same machine, but may include any communication coupling between system elements including specialized or standard computing bus technologies such as IDE, SCSI, PCI and InfiniBand. The interconnection element 414 enables communications, such as data and instructions, to be exchanged between system components of the computer system 402.

The computer system 402 also includes one or more interface devices 416 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 402 to exchange information and to communicate with external entities, such as users and other systems.

The data storage element 418 includes a computer readable and writeable nonvolatile, or non-transitory, data storage medium in which instructions are stored that define a program or other object that is executed by the processor 410. The data storage element 418 also may include information that is recorded, on or in, the medium, and that is processed by the processor 410 during execution of the program. More specifically, the information may be stored in one or more data structures specifically configured to conserve storage space or increase data exchange performance. The instructions may be persistently stored as encoded signals, and the instructions may cause the processor 410 to perform any of the functions described herein. The medium may, for example, be optical disk, magnetic disk or flash memory, among others. In operation, the processor 410 or some other controller causes data to be read from the nonvolatile recording medium into another memory, such as the memory 412, that allows for faster access to the information by the processor 410 than does the storage medium included in the data storage element 418. The memory may be located in the data storage element 418 or in the memory 412, however, the processor 410 manipulates the data within the memory, and then copies the data to the storage medium associated with the data storage element 418 after processing is completed. A variety of components may manage data movement between the storage medium and other memory elements and examples are not limited to particular data management components. Further, examples are not limited to a particular memory system or data storage system.

Although the computer system 402 is shown by way of example as one type of computer system upon which various aspects and functions may be practiced, aspects and functions are not limited to being implemented on the computer system 402. Various aspects and functions may be practiced on one or more computers having a different architectures or components than that shown in FIG. 4. For instance, the computer system 402 may include specially programmed, special-purpose hardware, such as an application-specific integrated circuit ("ASIC") tailored to perform a particular operation disclosed herein. While another example may perform the same function using a grid of several computing devices running MAC OS X with Intel Core i7 processors and several specialized computing devices running proprietary hardware and operating systems.

The computer system 402 may be a computer system including an operating system that manages at least a portion of the hardware elements included in the computer system 402. In some examples, a processor or controller, such as the processor 410, executes an operating system. Examples of a particular operating system that may be executed include a Windows-based operating system, such as the Windows 10 operating system, available from the Microsoft Corporation, a MAC OS X operating system available from Apple Computer, one of many Linux-based operating system distributions, for example, the Enterprise Linux operating system available from Red Hat Inc., a Solaris operating system available from Oracle, or a UNIX operating systems available from various sources. Many other operating systems may be used, and examples are not limited to any particular operating system.

The processor 410 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), or Python. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in JavaScript. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive or solid state drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

The examples provided herein are not intended to be exclusively limiting. For example, with reference to FIG. 1 discussed above, alternate topologies are considered to be part of this disclosure. Although FIG. 1 illustrates a single intelligent agent 110a configured to control a single respective device 112a, in alternate embodiments a single intelligent agent 110a may be configured to control a plurality of the client-side devices 112a-112n. Similarly, several of the intelligent agents 110a-110n may be configured to communicate with a single client-side device 112a.

The intelligent agents 110a-110n can communicate with client-side devices 112a-112n using any known communication medium. For example, the intelligent agents 110a-110n can communicate with the client-side devices 112a-112n through a wired network, a wireless network, a combination of wired and wireless networks, and so forth. Similarly, the observer 108 can communicate with the intelligent agents 110a-110n, the database 106, and the external data source 102 using a wired network, a wireless network, or a combination of wired and wireless networks.

Furthermore, no geographical or numerical limitation is intended to be implied with respect to the client-side devices 112a-112n. Any number of client-side devices 112a-112n may be distributed across any number of locations, regardless of the distance between the locations. In some embodiments, the client-side devices 112a-112n could be distributed across multiple continents. In alternate embodiments, the client-side devices 112a-112n could be contained within a single data center rack.

Similarly, no geographical or numerical limitation is intended to be implied with respect to the intelligent agents 110a-110n. Although certain benefits may be conferred as a result of positioning the intelligent agents 110a-110n proximately to one another, any number of the intelligent agents 110a-110n may be distributed across any geographical region. Each of the intelligent agents 110a-110n may have a dedicated user interface in some embodiments, while in others, a user 104 may be able to access all of the intelligent agents 110a-110n through a single centralized user interface that abstracts the information from the intelligent agents 110a-110n, such as through another consolidated component. The user 104 may be able to access the intelligent agents 110a-110n through a wired network, a wireless network, or a combination of wired and wireless networks. The remote computing infrastructure 114 in which the intelligent agents 110a-110n exist can be managed and supported, for example, in a microservices architecture such as an implementation of Akka actors or Microsoft's Azure Service Fabric. In some embodiments, the remote computing infrastructure 114 is a single computer. In other embodiments, the remote computing infrastructure 114 comprises a plurality of computers.

In some embodiments, a first portion of the intelligent agents 110a-110n may be accessible through a dedicated user interface, and a second portion of the intelligent agents 110a-110n may be accessible through a single centralized user interface which can be executed using another component. The first and second portions may include none, some, or all of the intelligent agents 110a-110n. In at least one embodiment, the user 104 may be able to access the observer 108 through a user interface in addition to, or in lieu of, being able to access the intelligent agents 110a-110n through a user interface.

Furthermore, the observer 108 may not be a single entity in some examples. The observer 108 can comprise multiple entities that communicate to execute the operations discussed herein. Similarly, the database 106 may not be a single entity in certain examples. The database 106 can comprise multiple databases that communicate with the observer 108 and one another to exchange information with the observer 108. The external data source 102 is also not to be construed as necessarily being a single entity. For example, the external data source 102 can include a database containing weather data, a separate database containing electrical grid information for a first region, a separate database containing electrical grid information for a second region, and so forth.

Although examples provided herein have described particular advantages associated with online UPSs, the principles of this disclosure are applicable to a wide variety of devices, including offline UPSs, line-interactive UPSs, PDUs, and other devices that are not power devices at all. Generally speaking, any device that is able to benefit from performing high-complexity computations remotely from the device, and any device that is able to benefit from a dynamic control scheme that adapts to changing conditions affecting a large number of similar and different devices, benefits from the principles discussed herein. Significant improvements to any of the systems in which the devices are implemented is provided by extending device life, optimizing device performance, increasing device adaptability, enhancing user experience, and so forth.

Embodiments are not limited in their application to the details of construction and the arrangement of components set forth in the following description or illustrated in the drawings. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

What is claimed is:

1. A system for optimizing control schemes executed by a plurality of intelligent agent devices controlling a plurality of power supply devices, the system comprising:
    an observer device configured to communicate with the plurality of intelligent agent devices, a database configured to store information received from the plurality of intelligent agent devices, and an external data source, the observer device being further configured to:
        poll the plurality of intelligent agent devices for first operational information of at least one power supply device of the plurality of power supply devices;
        collect information from the external data source and from the database;
        update the database based on the first operational information and the information collected from the external data source and the database; and
        modify a first control scheme executed by a first intelligent agent device of the plurality of intelligent agent devices, wherein modifying the first control scheme includes modifying parameters of a scheme according to which the first intelligent agent device controls operation of a first power supply device of the plurality of power supply devices, and wherein the observer device modifying the first control scheme executed by the first intelligent agent device according to which the first intelligent agent device controls operation of the first power supply device is based on second operational information indicative of power supplied by a second power supply device of the plurality of power supply devices, the second power supply device being controlled by a second intelligent agent device.

2. The system of claim 1, wherein the first operational information of the at least one power supply device includes operational information of at least one of an uninterruptible power supply or a power distribution unit.

3. The system of claim 1, further comprising the plurality of intelligent agent devices, wherein each intelligent agent device of the plurality of intelligent agent devices is configured to execute high-complexity tasks on behalf of a respective power supply device and is further configured to control the respective power supply device.

4. The system of claim 1, wherein the observer device is configured to poll the plurality of intelligent agent devices for control information, the control information including user preference information.

5. The system of claim 4, wherein the observer device is configured to update the database based on the control information, and the database is configured to store the control information.

6. The system of claim 1, wherein the observer device is configured to execute a machine learning algorithm to optimize the first control scheme using information received from the plurality of intelligent agent devices, the external data source, and the database.

7. The system of claim 6, wherein executing the first control scheme includes controlling the first power supply device to provide back-up power outside of a back-up battery threshold.

8. The system of claim 7, wherein optimizing the first control scheme includes optimizing the back-up battery threshold.

9. The system of claim 1, wherein the observer device, the plurality of intelligent agent devices, and the database are implemented in a remote computing infrastructure.

10. A method for optimizing control schemes executed by a plurality of intelligent agent devices, the method comprising:
    polling the plurality of intelligent agent devices for first operational information of at least one power supply device of a plurality of power supply devices;
    collecting external information from an external data source;
    collecting previously stored operational information of the at least one power supply device from a database;
    updating the database based on the first operational information of the at least one power supply device and based on the external information; and
    modifying a first control scheme executed by a first intelligent agent device of the plurality of intelligent agent devices, wherein modifying the first control scheme includes modifying parameters of a scheme according to which the first intelligent agent device controls operation of the at least one power supply device, and wherein modifying the first control scheme according to which the first intelligent agent device controls operation of the at least one power supply device is based on second operational information indicative of power supplied by a second power supply device of the plurality of power supply devices, the second power supply device being controlled by a second intelligent agent device.

11. The method of claim 10, wherein polling the plurality of intelligent agent devices for the first operational information of the at least one power supply device includes polling the plurality of intelligent agent devices for operational information of at least one of a power distribution unit or an uninterruptible power supply.

12. The method of claim 10, further comprising polling the plurality of intelligent agent devices for control information, the control information including user preference information.

13. The method of claim 12, further comprising updating the database based on the control information.

14. The method of claim 11, further comprising executing a machine learning algorithm to optimize the act of modifying the first control scheme executed by the first intelligent agent device of the plurality of intelligent agent devices.

15. The method of claim 11, wherein executing the first control scheme includes controlling the at least one power supply device to provide back-up power outside of a back-up battery threshold.

16. A non-transitory computer-readable medium storing sequences of computer-executable instructions for optimizing control schemes implemented by a plurality of intelligent agent devices, the sequences of computer-executable instructions including instructions that instruct at least one processor to:
    poll the plurality of intelligent agent devices for first operational information of a first power supply device of a plurality of power supply devices;
    collect external information from an external data source;
    collect previously stored operational information of the first power supply device from a database;
    update the database based on the first operational information of the first power supply device and based on the external information; and
    modify a first control scheme executed by a first intelligent agent device of the plurality of intelligent agent devices, wherein modifying the first control scheme includes modifying a scheme according to which the first intelligent agent device controls operation of a first power supply device, and wherein modifying the first control scheme according to which the first intelligent agent device controls operation of the first power supply device is based on second operational information indicative of power supplied by a second power supply device of the plurality of power supply devices, the second power supply device being controlled by a second intelligent agent device.

17. The non-transitory computer-readable medium of claim 16, wherein the at least one processor is further configured to poll the plurality of intelligent agent devices for control information, the control information including user preference information.

18. The non-transitory computer-readable medium of claim 16, wherein instructing the at least one processor to poll the plurality of intelligent agent devices for first operational information of first power supply device includes instructing the processor to poll the plurality of intelligent agent devices for operational information of at least one of a power distribution unit or an uninterruptible power supply.

19. The non-transitory computer-readable medium of claim 16, wherein the at least one processor is further configured to execute a machine learning algorithm to optimize the act of modifying the first control scheme executed by the first intelligent agent device of the plurality of intelligent agent devices.

20. The non-transitory computer-readable medium of claim 16, wherein instructing the at least one processor to execute the first control scheme includes controlling the first power supply device to provide back-up power outside of a back-up battery threshold.

21. The system of claim 1, further comprising at least one of the external data source or the database.

* * * * *

UNITED STATES PATENT AND TRADEMARK OFFICE
CERTIFICATE OF CORRECTION

PATENT NO. : 11,184,440 B2
APPLICATION NO. : 15/622478
DATED : November 23, 2021
INVENTOR(S) : Fallon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 121 days.

Signed and Sealed this
Tenth Day of January, 2023

*Katherine Kelly Vidal*
*Director of the United States Patent and Trademark Office*